United States Patent [19]

Gambino et al.

[11] 4,330,848
[45] May 18, 1982

[54] CHARGED WALL AMORPHOUS MAGNETIC LAYERS

[75] Inventors: Richard J. Gambino, Yorktown Heights; Robert C. Taylor, Katonah, both of N.Y.

[73] Assignee: International Business Machines Corporation, Armonk, N.Y.

[21] Appl. No.: 129,006

[22] Filed: Mar. 10, 1980

[51] Int. Cl.³ ............................................. G11C 19/08
[52] U.S. Cl. ....................................... 365/32; 365/34; 365/41
[58] Field of Search ....................... 365/32, 33, 34, 36, 365/41

[56] References Cited
PUBLICATIONS

IBM Technical Disclosure Bulletin–vol. 18, No. 9, Feb. 1976, pp. 3082-3084.
IBM Technical Disclosure Bulletin–vol. 23, No. 2, Jul. 1980, pp. 844-845.
IBM Technical Disclosure Bulletin–vol. 17, No. 2, Jul. 1974, p. 625.
IBM Technical Disclosure Bulletin–vol. 18, No. 3, Aug. 1975, p. 934.

Primary Examiner—James W. Moffitt
Attorney, Agent, or Firm—Jackson E. Stanland

[57] ABSTRACT

Amorphous ferrimagnetic layers are described with support stable and mobile magnetic charged walls. These layers can be used as drive layers in magnetic bubble domain devices, and are characterized by very weak even-fold in-plane anisotropy, or substantially zero in-plane anisotropy. The layers are metallic alloy compositions having magnetic properties that can be tailored over wide ranges, and are particularly suitable as drive layers for the propagation of bubble domains of extremely small diameters.

15 Claims, 2 Drawing Figures

CHARGED WALL AMORPHOUS MAGNETIC LAYERS

DESCRIPTION

TECHNICAL FIELD

This invention relates to magnetic bubble domain devices using amorphous films for drive layers, and more particularly to the use of ferrimagnetic amorphous films having hard perpendicular anisotropy but substantially zero in plane easy axis anisotropy for supporting magnetic charged walls that can be used to move magnetic bubble domains, and especially bubble domains having diameters of approximately 1 micron and less.

BACKGROUND ART

In magnetic bubble domain technology, magnetic bubble domains are used to represent information. For example, the presence of a magnetic bubble domain can be a binary one, and the absence of a magnetic domain can be a binary zero. Additionally, the bubble domains can be coded in accordance with their wall magnetization properties so that one type of domain can represent a binary one, while another type of domain represents a binary zero. Still further, multi-level coding is possible.

In typical magnetic bubble domain memories, bubble domains are moved in shift register patterns in order to store information. Various techniques have been shown for movement of bubble domains. In one of these techniques, so called "contiguous disk" devices are used in which the propagation elements for moving the bubble domains are contiguous with one another. This type of propagation pattern has particular advantages in terms of the density which can be achieved for a given lithography. Since the propagation elements themselves are considerably larger than the bubble domains, the lithographic constraints on the techniques used to make the contiguous propagation elements are minimized for a given size of bubble domain.

Contiguous disk type bubble domain structures can have shapes other than those involving circles. For instance, contiguous diamond patterns have been shown, and in general the propagation pattern is one in which a bubble domain is moved along a generally undulating pattern edge, there being convex and concave portions alternately arranged along the edge. These contiguous element propagation patterns have typically been fabricated by ion implantation of a magnetic garnet layer. Ion implantation causes the magnetization within the garnet to lie substantially in the plane of the garnet and, if certain material constraints are followed, the ion implanted garnet will support stable magnetic charged walls. These magnetic charged walls have been described by Y. S. Lin et al in IEEE Transactions on Magnetics, Vol. MAG-14, No. 5, September 1978, at Page 494.

The use of magnetic charged walls to move magnetic bubble domains coupled to these walls has been described by G. S. Almasi et al in American Institute of Physics Conference Proceedings, Vol. 24, Page 630, (1974) and by Y. S. Lin et al, J. Appl. Phys., Vol. 48, Page 5201 (December 1977).

In contiguous element propagation patterns of this type, the existence of stable magnetic charged walls is essential for movement of the bubble domains. U.S. Pat. Nos. 4,070,658 (propagation), 4,142,250 (translation switch), and 4,128,895 (nucleator) describe various devices using magnetic charged walls for movement of bubble domains. Although a complete magnetic bubble domain chip can be devised using magnetic charged walls to perform many of the storage functions, the use of magnetic garnets to provide the ion implanted drive layer is not without some disadvantages. For example, ion implanted magnetic garnet films exhibit cubic anisotropy in the plane of the drive films. This means that in-plane easy and hard axes are present, and larger magnetic drive fields have to be provided to move the bubble domains from an easy axis direction toward a hard axis direction. In order to overcome this, co-pending application Ser. No. 959,960, filed Nov. 13, 1978, in the name of C. D. Cullum et al (now U.S. Pat. No. 4,247,912) describes the design of a magnetic bubble domain chip in which the various components comprising the chip are aligned in specific directions with respect to the easy axis directions in the plane of the garnet drive layer.

In order to provide good magnetic coupling between a magnetic charged wall and a bubble domain which is to be moved by the charged wall, certain considerations have to be followed with respect to the magnetization and thickness of the drive layer, and with respect to the magnetization and thickness of the bubble domain film. As a general rule, the thickness-magnetization product of the drive layer must be approximately the same as that of the bubble domain storage layer for good coupling. As the magnetic bubble domain size decreases, the magnetization of the storage layer must increase. In order to provide sufficient charged wall coupling, the magnetization of the drive layer would also have to increase. However, as the magnetizaton of the drive layer increases, it becomes more and more difficult to successfully ion implant it to provide an in-plane drive layer. Thus, for bubble domains of approximately 1 micron and less, the use of garnet drive layers may not be possible. As the bubble domain size decreases to approximately ½ micron, the use of garnet drive films for contiguous disk type devices will be very difficult.

Another factor with respect to the use of garnet drive layers is that there is not a great deal of flexibility in their preparation, and the amount of magnetization $4\pi M_s$ which can be obtained is limited, the maximum being about 1750 G for Yttrium Iron Garnet. Thus, it is difficult to increase the thickness-magnetization product in garnets without using very thick films. At the present time, they are primarily grown by liquid phase epitaxy or by chemical vapor deposition. Although some work has been described with respect to evaporation and sputtering of garnet films, well defined techniques for reproducible growth of these films is not clearly evident. However, as the magnetization increases, the difficulty in ion implantation also increases, as noted previously.

In the practice of the present invention, another suitable drive layer having particular utility for the provision of stable magnetic charged walls for movement of very small bubble domains has been sought. For this purpose, a class of amorphous magnetic materials is proposed, the materials being ferrimagnets having an in-plane magnetization with zero, or very little planar anisotropy. These amorphous ferrimagnets have low coercivity, a hard perpendicular anisotropy, and a magnetization which lies perfectly in the plane of the drive layer. This contrasts with the magnetization in the plane of an ion implanted garnet layer, which generally makes a very small angle with respect to the plane of the drive layer. Due to this canted magnetization in the garnet drive layers, the propagation magnetic field has to overcome this small vertical angle, in addition to having to overcome the hard in-plane axes in the garnet layers.

Amorphous ferrimagnetic drive layers have advantages over garnet drive layers in that they do not exhibit a cubic anisotropy in the plane of the film and therefore do not have the in-plane orientation effects described with respect to the garnets. For this reason, potentially lower magnetic drive fields are required and the propagation patterns do not have to be aligned with respect to certain axes. Also, the amorphous ferrimagnetic films can be prepared in a number of ways, including sputtering and evaporation, and have a wide range of properties because their compositions can be varied over greater ranges than those of the garnets. For example, alloy metallic films can be prepared having high $4\pi M$ and adjustable Q (quality factor of the film). In this manner, they are more useful as drive layers for small bubble domains which require high $4\pi M$ materials. Since ion implantation is not required to produce the necessary in-plane magnetization, these amorphous drive layers can easily be used with bubble domain storage layers having high magnetization.

The choice of ferrimagnetic amorphous materials as drive layers in contiguous disk type devices involved considerable experimentation and was not apparent from the prior art. A substantial body of prior art existed which suggested that charged magnetic walls would not be stable in a film without in-plane anisotropy $H_k$. For example, Puchalska et al compared the domain structure of ion implanted garnets to that of amorphous Co-P, among others, at the Magnetism and Magnetic Materials Conference, Cleveland, 1978, and concluded that they had different types of domain structure. That is, Co-P did not support charged domain walls. At this same conference, Kobliska et al reported on the magnetic properties of amorphous metalloid compositions, such as FeB. They suggested that these compositions could be used as a replacement for permalloy in bubble domain devices such as C-bar devices. No mention was made of their applicability as replacements for garnets in contiguous disk type devices, or that they would be able to support charged walls. At the 1979 Intermag Conference, held in Florence, Italy, C. C. Shir et al indicated that the cubic anisotropy in ion implanted garnets was essential for charged wall stability. Further, H. Callen, J. Appl. Phys. 50, No. 3, Page 1457 (March 1979) indicated that an odd-fold planar anisotropy was essential to bubble propagation by ion implanted garnet layers. Since suitable amorphous films can be made which do not exhibit this anisotropy, and since amorphous films having very small planar anisotropy have two-fold (even) anisotropy, this art led away from their possible use as charged wall drive layers.

Accordingly, it is a primary object of the present invention to provide contiguous propagation element bubble domain devices using an improved drive layer capable of supporting stable magnetic charged walls which can be used to move magnetic bubble domains having diameters of one micron and less.

It is another object of the present invention to provide magnetic charged wall bubble domain devices using amorphous magnetic layers as drive layers.

It is another object of the present invention to provide magnetic bubble domain devices using magnetic charged walls to move the bubble domains, which require smaller drive magnetic fields than those presently used.

It is still another object of the present invention to provide an improved drive layer for supporting magnetic charged walls for movement of magnetic bubble domains, wherein the improved drive layer has very small, or substantially zero anisotropy in the plane of the drive layer.

It is a further object of the present invention to provide a magnetic drive layer for movement of magnetic bubble domains by charged walls, wherein the drive layer can be easily fabricated with a wide choice of magnetic properties.

It is a still further object of the present invention to provide magnetic bubble domain devices using magnetic charged walls for movement of magnetic bubble domains, wherein the drive layer supporting the charged magnetic walls can be fabricated by a variety of methods, and on any type of magnetic bubble domain storage layer.

It is a further object of the present invention to provide an amorphous drive layer capable of supporting stable magnetic charged walls, in which the magnetic charged walls will move smoothly during reorientation of the magnetic drive field, in contrast with the movement of magnetic charged walls in garnet drive layers, which is often uneven due to "whip and flip" charged wall motion.

It is another object of the present invention to provide amorphous ferrimagnetic metals which can support stable and mobile charged walls in layers having very small in-plane anisotropy field.

DISCLOSURE OF INVENTION

Amorphous ferrimagnetic layers are used as drive layers to support stable magnetic charged walls. These magnetic charged walls are coupled to bubble domains in a bubble domain storage layer, and move the bubble domains as the magnetic charged walls move, due to the reorientation of a magnetic drive field in the plane of the drive layer. Any type of bubble domain component, including nucleators, transfer switches, annihilators, and propagation elements can be provided using these amorphous magnetic drive layers. The bubble storage layers can be of any type, including garnets and amorphous magnetic materials.

The amorphous magnetic drive layers are ferrimagnets having planar magnetization and charged walls between $tM_s$ of about 10 and 600, where t is the thickness of the drive layer in microns and $M_s$ is its saturation magnetization in Gauss. These layers exhibit low coercivity ($H_c < 10$ Oe) and can be prepared by evaporation or sputtering. Very low or zero planar anisotropy results when the substrates are rotated during evaporation, or when the amorphous layers are prepared by sputtering. Generally, the in-plane anisotropy field $H_k(||)$ is less than 100 Oe, and can be made $<10$ Oe. This means that smooth charged wall rotation around propagation patterns will be obtainable and that low drive fields should be required. Due to the absence of substantial anisotropy in the plane of the drive layers, equally reliable propagation paths will occur in all directions in the plane of the drive layer.

The charged walls in these amorphous ferrimagnets are of sufficient intensity to easily couple to magnetic bubble domains, and especially very small magnetic bubble domains having diameters less than 1 micron. Additionally, these amorphous films can be prepared with low coercivity (i.e., less than 10 Oe) and very low or substantially zero in-plane anisotropy. Thus, the charged walls are mobile without the requirement for high amplitude magnetic drive fields.

Representative examples of amorphous magnetic layers supporting stable magnetic charged walls are ferrimagnetic alloys of GdCo, GdCoNi, and GdFeB. Of these, the latter is the best, although substrate rotation during deposition can be used to improve the magnetic properties of the other two alloy systems. Other amorphous systems include sputtered GdFeAu and GdCoB alloys.

These and other objects, features, and advantages will be more apparent from the following more particular description of the preferred embodiments.

BEST MODE FOR CARRYING OUT THE INVENTION

Figure 1:
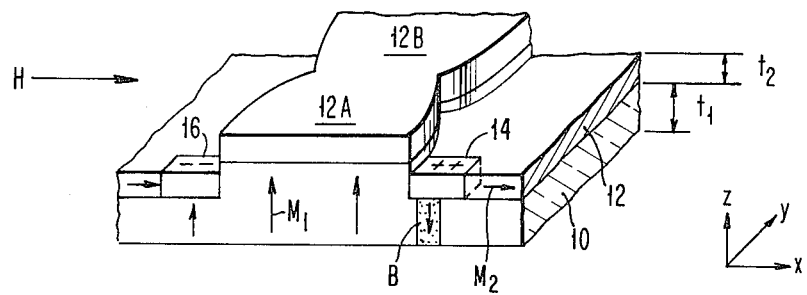
FIG. 1 is a perspective view of a bubble domain storage layer having an amorphous drive layer thereon, in which successful propagation of bubble domains is obtained by coupled magnetic charged walls in the drive layer.

FIG. 1 shows a structure using contiguous propagation elements to move magnetic bubble domains B in a bubble domain storage layer 10. Storage layer 10 is ion milled to provide contiguous disk-shaped portions having a greater thickness than the rest of storage layer 10. A drive layer 12 is then evaporated or sputtered onto storage layer 10, and comprises an amorphous ferrimagnetic metal having in-plane magnetization $M_2$. Regions 12A and 12B of the drive layer are disk-shaped and at a higher level than the remainder of drive layer 12. Disks 12A and 12B are not required for successful bubble propagation. The magnetization $M_1$ of storage layer 10 is perpendicular to the plane of the storage layer and opposite in direction to the magnetization within bubble domain B. The thickness of storage layer 10 beneath drive layer 12 is $t_1$ while the thickness of the drive layer is $t_2$.

In the presence of a magnetic drive field H in the +x direction, a converging charged wall 14 will be produced, as will be a diverging charged wall 16. The converging charged wall is attractive to the bubble domain B, and it will follow this charged wall as it moves around the edges of the amorphous drive layer 12, in response to the reorientation of field H. This type of movement of bubble domains in response to a coupled charged wall is well known in the art and will not be explained further. Generally, the product of $t_1 M_1$ must be approximately equal to the product $t_2 M_2$ in order to have good coupling between the charged wall and the magnetic bubble domain. This coupling is responsible for smooth movement of the bubble domains with the movement of the charged wall 14. If there is good coupling between the charged wall and the bubble domain, and if the charged wall moves smoothly along the periphery of the amorphous drive layer 12, there will be good margins for bubble domain propagation.

In the practice of this invention, it has been found that amorphous ferrimagnetic films can be prepared with an easy plane of magnetization and can support mobile, stable magnetic charged walls if the product of magnetization (Gauss) and thickness (microns) of the amorphous layer is between 10 and 600. Bubble domains can be easily propagated using the amorphous drive layer in spite of its lack of cubic anisotropy. These charged wall structures are highly mobile due to low coercivity $H_c$ and low in-plane anisotropy field $H_k$. Not only do the charged walls away from the edges of disks 12A and 12B readily follow the applied field H, but also the positions at which the charged walls join the discontinuity along these disks readily move with the applied field. It appears that the movement of the free walls away from the discontinuities is governed by coercivity, while the movement of the walls along the edges of the disk is governed by the anisotropy field.

Charged walls away from discontinuities in these amorphous drive layers have a vertex angle (i.e., the angle at the apex of the saw tooth wall) given by the following expression, if the product of $M_2$ and $t_2$ is between 20 and 600:

$$\theta = \frac{\pi(\pi A)^{\frac{1}{2}}}{2 M_2 t_2} + C$$

where A is the exchange constant and C is an empirical correction to account for the angle below which magnetic charged walls can no longer exist due to high magnetostatic energy.

The following table lists some suitable materials for the amorphous drive layers 12. This table lists the various magnetic properties of these amorphous drive layers, including the saturation magnetization $4\pi M_s$, coercivity $H_c$, in-plane anisotropy field $H_k(||)$, inplane uniaxial anisotropy $K_u(||)$, and perpendicular uniaxial anisotropy $K_u(\perp)$.

| Material | $4\pi M_s$ (G) | $H_c$ (Oe) | $H_k(\|\|)$ (Oe) | $K_u(\|\|)$ ergs/cm³ | $-K_u(\perp)$ ergs/cm³ |
|---|---|---|---|---|---|
| AMORPHOUS CHARGED WALL MATERIALS | | | | | |
| e-$Gd_xCo_{1-x}$ | | $\frac{1.5 \times 10^5}{4\pi M_s}$ | $6 H_c$ | | |
| x = 0.1–0.3 | 350–10,000 | 450–15 | | $2$–$5 \times 10^4$ | $3$–$5 \times 10^5$ |
| 1,000–6,000Å | (1,000) | (150) | (900) | | |
| e-$Gd_x(Co_y Ni_{1-y})_{1-x}$ | | $\frac{3.0 \times 10^4}{4\pi M_s}$ | $5 H_c$ | | |
| x = 0.15–0.3 y = 0.25, 0.5 | 150–2,250 | 200–10 | | $\sim 6 \times 10^3$ | $\sim 1 \times 10^5$ |
| 1,000–6,000Å | (1,000) | (30) | (150) | | |
| s-$(Gd_xFe_{1-x})_{0.9}B_{0.1}$ | | $\frac{1.2 \times 10^4}{4\pi M_s + 700}$ | 0 ($\sim 2 H_c$ t.b.) | | |

-continued

AMORPHOUS CHARGED WALL MATERIALS

| Material | $4\pi M_s$ (G) | $H_c$ (Oe) | $H_k(\|\|)$ (Oe) | $K_u(\|\|)$ ergs/cm$^3$ | $-K_u(\perp)$ ergs/cm$^3$ |
|---|---|---|---|---|---|
| x = 0.16–0.39 3,400–8,000Å | 350–5,500 (1,000) | 10–2 (7) | 0 | 0 | ~5 × 10$^4$ |
| Garnet | 650 | 1 | 100 | ~3 × 10$^3$ ($K_1$) | 0 |

Within each row of the table, the coercivity and anisotropy were uniquely defined by the magnetization over the entire range of compositions and thicknesses that were studied. As is apparent from this table, the magnetization, coercivity, and anisotropy of these materials varies over a range of two orders of magnitude. This enables a designer to readily match the magnetic drive layer to the storage layer in order to provide effective coupling of the attractive charge wall to the bubble domains in the storage layer.

In this table, films which have been evaporated are denoted by the letter "e" while films that have been sputtered are denoted by the letter "s". In each column the number in parenthesis is a number representative of an illustrative value of that magnetic parameter, for films of the compositions and thicknesses indicated. For example, the three amorphous drive layers listed have illustrative $4\pi M_s$ values of 1,000 G. The letters "t.b." indicate thermal backing of the substrate during deposition.

The last row of the table shows the magnetic properties of a typically used garnet for providing charged wall drive layers. A representative garnet is $Gd_{0.9}Tm_{1.1}Y_{1.0}Ga_{0.45}Fe_{4.55}O_{12}$, which has been ion implanted. Although not listed in the table, charged walls have also been observed in sputtered GdFeAu layers and in sputtered GdCoB layers. All of the amorphous drive layers described here displayed a hard perpendicular axes of magnetization.

Evaporated films have an in-plane uniaxial anisotropy, as indicated by $H_k(\|\|)$ and $K_u(\|\|)$ in the table. This is due to the directionality of the vapor streams in the evaporation process, and can be altered by rotation of the substrate during evaporation, as noted by R. C. Taylor et al, J. Appl. Phys. 47, 4666 (1976). Fast rotation rates (300 rpm, etc.) can be used to significantly lower $H_k(\|\|)$. The hard planar axis is about an order of magnitude less hard than the perpendicular axis $K_u(\perp)$. Planar uniaxial anisotropy is encountered in sputtered films only when the substrates are thermally backed (t.b.) during deposition. For example, for GdFeB alloys, $H_k(\|\|)$ is approximately 2.5 $H_c$. Otherwise, it is zero. For a given magnetization, coercivity and anisotropy field decrease markedly as one goes from GdCo to GdCoNi to GdFeB. For a typical $4\pi M_s$ of 1,000 G, GdCo has a coercivity of 150 Oe and planar anisotropy field of 900 Oe, while the corresponding values for GdCoNi are 30 Oe and 150 Oe, and for GdFeB are 7 Oe and 0 Oe (or 20 Oe anistropy field for thermally backed samples).

Coercivity and anisotropy field become of prime importance in charged wall mobility, and therefore in the design of bubble domain devices. It has been observed that walls are mobile in the direction of the planar easy axis when an applied in-plane field exceeds $H_c$, but the field must exceed $H_k$ to move the walls in any other direction. In the films listed in the table, this is most readily accomplished in GdFeB, where $H_c$ and $H_k$ are low. It is more difficult to achieve this in the GdCo films, where these values are higher. Generally, charged walls are more difficult to move when $M_s t$ is low and $H_c$ and $H_k$ are high.

In a particular example, a sputtered amorphous drive layer of GdFeB having $4\pi M_s = 500$ G, $H_c = 6$ Oe, and $H_k$ close to zero has supported bubble rotation around disks and diamonds by a coupled charged wall. This drive layer was sputtered onto a patterned garnet storage layer, the garnet storage layer having a thicker portion along the edges of the amorphous drive layer, as shown in FIG. 1.

This table illustrates that an $H_k(\|\|)$ is not needed to support stable magnetic charged walls. Since substrate rotation during deposition will greatly decrease $H_k(\|\|)$, these values can be lowered considerably from those shown in the table (which are measured for amorphous layers deposited on stationary substrates). $H_c$ changes little, if at all, with substrate rotation.

The GdCo alloys exhibited stable charged walls, but they were not very mobile due to the high values of $H_k(\|\|)$ and $H_c$. Still, there may be useful applications for these films, absent preparation by substrate rotation to lower $H_k(\|\|)$.

In this table, the values of x and y can be varied beyond the values indicated, and the thicknesses can also be varied from those listed therein. Generally, as $M_s$ increases, $H_c$ and $H_k(\|\|)$ decrease. Although not listed in this table, sputtered alloys of GdFeAu and GdCoB also exhibited stable charged walls.

Figure 2:
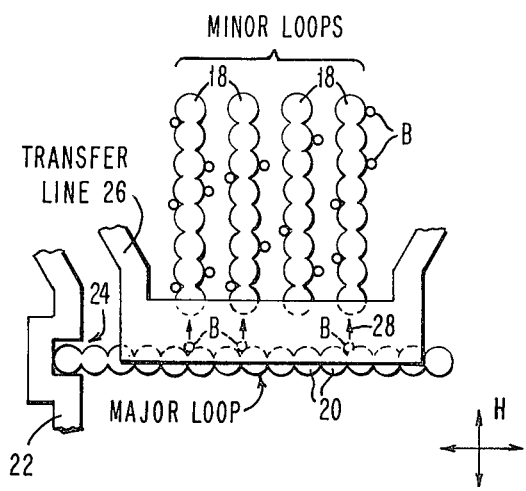
FIG. 2 shows a magnetic bubble domain storage device, organized in a major/minor loop organization, for movement of bubble domains by magnetic charged walls, wherein an amorphous ferrimagnetic material is used as the drive layer.

FIG. 2 shows a typical major/minor loop memory organization used to move magnetic bubble domains via attractive charged walls. This type of storage organization is well known in the art and will not be described in great detail.

In FIG. 2, the minor loops are comprised of propagation patterns including the amorphous ferrimagnetic disks 18. The regions around disks 18 also contain an amorphous drive layer at a lower level, in accordance with the structure shown in FIG. 1. This "lower level" layer is patterned to have an undulating edge (defined by the disks 18) which is the propagation pattern that moves the bubbles, indicated by circles B. Accordingly, the major loop is also comprised of a propagation circuit having amorphous metallic disks 20 at a higher level than the surrounding areas which are also an amorphous drive layer. Bubble domains B move along the major loop and minor loops as a magnetic drive field H reorients.

A nucleate conductor 22 carries a current therein which is used to form a bubble domain within the cusp 24 of this conductor. Thus, a bubble domain will be formed at the extreme left-hand end of the major loop and will propagate along the top propagation edge of the major loop to the vicinity of the minor loops. By sending a current through transfer line 26, these bubble domains are transferred to the minor loops, as indicated by the arrows 28.

In the practice of this invention, any type of bubble domain storage organization or other type of organization can be provided using amorphous ferrimagnetic drive layers. Also, the concepts of charged wall nucleation and charged wall transfer can be used to design devices using these amorphous drive layers.

The invention is particularly directed to the provision of a structure for movement of bubble domains having diameters of less than about 1 micron by coupling to mobile charged walls. For these very small bubble domains, conventionally used ion implanted drive layers are not suitable, and drive layers of the types described herein will have to be used. Of course, it may be possible to use these amorphous ferrimagnetic layers in applications other than bubble devices.

While the invention has been described with respect to particular embodiments, the general principles of the invention will enable researchers to discover other amorphous ferrimagnetic materials that can be used for the purposes stated herein.

Having thus described our invention, what we claim as new, and desire to secure by Letters Patent is:

1. A magnetic bubble domain device for moving magnetic bubble domains in a bubble domain storage layer in response to the reorientation of a magnetic field, comprising in combination:
   a magnetic bubble domain storage layer in which magnetic bubble domains can be propagated,
   an amorphous magnetic drive layer adjacent to said magnetic storage layer for supporting stable and mobile magnetic charged walls which are coupled to bubble domains in said storage layer, and which move along patterned contiguous propagation elements formed in said amorphous drive layer as said magnetic field reorients in the plane of said drive layer, said drive layer being comprised of an amorphous ferrimagnetic material having a hard perpendicular anisotropy and substantially zero in-plane easy axis anisotropy, and
   means for applying said reorienting magnetic field in the plane of said amorphous drive layer.

2. The device of claim 1, where the product of the thickness of the amorphous drive layer in microns and its saturation magnetization in Gauss is between 10 and 600.

3. The device of claim 1, where said amorphous drive layer is a ferrimagnet chosen from the group comprising GdCo alloys, GdCoNi alloys, GdFeB alloys, GdFeAu alloys, and GdCoB alloys.

4. The device of claim 1, where the in-plane anisotropy field $H_K(||)$ of the drive layer is less than 100 Oe.

5. The device of claim 1, where said magnetic bubble domain storage layer supports magnetic bubble domains having diameters less than 1 micron.

6. The device of claim 1, where said magnetic bubble domain storage layer supports magnetic bubble domains having diameters of about $\frac{1}{2}$ micron and less.

7. A magnetic bubble domain device including a drive layer in which stable magnetic charged walls can be created and moved and an associated storage layer in which magnetic bubble domains can be created and moved, comprising in combination:
   a magnetic bubble domain storage layer in which magnetic bubble domains having diameters of less than 1 micron are moved,
   a drive layer adjacent to said storage layer for movement of magnetic bubble domains along the edges of contiguous propagation elements formed in said drive layer in response to the reorientation of a magnetic field in the plane of said drive layer, said drive layer being an amorphous ferrimagnetic material having in-plane magnetization and in which magnetic charged walls can be created and moved in response to said magnetic field along the periphery of said contiguous propagation elements, said amorphous ferrimagnetic material having a hard uniaxial anisotropy and an in-plane anisotropy field of less than 10 Oe, said drive layer having a coercivity less than about 10 Oe, and
   means for applying said reorienting magnetic field in the plane of said amorphous drive layer.

8. The device of claim 7, where the product of the thickness of the drive layer in microns and its saturation magnetization in Gauss is less than 600.

9. The device of claim 7, where said storage layer is comprised of an amorphous magnetic material having a perpendicular anisotropy.

10. A magnetic bubble domain storage device, including:
    a magnetic storage layer in which magnetic bubble domains can be moved,
    a magnetic drive layer in which stable magnetic charged walls are mobile, said magnetic drive layer being patterned to provide contiguous propagation elements therein, said magnetic charged walls moving along said propagation pattern when a magnetic field reorients in the plane of said magnetic drive layer, said magnetic drive layer being comprised of an amorphous ferrimagnetic metal having a hard perpendicular anisotropy and a small in-plane anisotropy, said in-plane anisotropy being an even-fold anisotropy, and
    means for applying said reorienting magnetic drive field in the plane of said amorphous magnetic drive layer.

11. The device of claim 10, where said amorphous drive layer has an in-plane anisotropy field less than 100 Oe.

12. The storage device of claim 11, where said amorphous drive layer has a coercivity less than 10 Oe.

13. The storage device of claim 12, where said amorphous drive layer has a thickness-magnetization product which is less than 600, said thickness being measured in microns and said magnetization being measured in Gauss.

14. A magnetic layer capable of supporting stable and mobile magnetic charged walls which can move along a discontinuity in said layer when a reorienting magnetic field is applied in the plane of said layer, said layer being comprised of an amorphous ferrimagnetic material which is a metal alloy, said layer having a hard perpendicular anisotropy and an in-plane anisotropy field less than 10 Oe and a coercivity less than 10 Oe.

15. An amorphous magnetic layer capable of supporting stable and mobile charged walls which can move along a discontinuity in said layer when a reorienting magnetic field is applied in the plane of said layer, said layer being comprised of an amorphous ferrimagnetic material having a hard perpendicular anisotropy and substantially zero in-plane easy axis anisotropy, and having a coercivity less than 10 Oe, said amorphous layer being a metal alloy having a product of thickness-magnetization less than 600, where thickness is measured in microns and magnetization is measured in Gauss.

* * * * *